US012347980B2

(12) United States Patent
Zhao et al.

(10) Patent No.: US 12,347,980 B2
(45) Date of Patent: Jul. 1, 2025

(54) HIGH-SPEED NETWORK CONNECTOR WITH INTEGRATED MAGNETICS

(71) Applicant: Amphenol Corporation, Wallingford, CT (US)

(72) Inventors: Lily Li Zhao, ShenZhen (CN); Kelvin Kun Tang, ShenZhen (CN); Simon Shih, New Taipei (TW); Adrian Green, Newcastle (CA)

(73) Assignee: AMPHENOL CORPORATION, Wallingford, CT (US)

( * ) Notice: Subject to any disclaimer, the term of this patent is extended or adjusted under 35 U.S.C. 154(b) by 519 days.

(21) Appl. No.: 17/514,175

(22) Filed: Oct. 29, 2021

(65) Prior Publication Data

US 2023/0132895 A1 May 4, 2023

(51) Int. Cl.
*H01R 13/7193* (2011.01)
*H01F 27/24* (2006.01)
(Continued)

(52) U.S. Cl.
CPC ......... *H01R 13/7193* (2013.01); *H01F 27/24* (2013.01); *H01F 27/28* (2013.01);
(Continued)

(58) Field of Classification Search
CPC .. H01R 13/7193; H01R 12/722; H01R 13/02; H01R 13/05; H01R 13/648;
(Continued)

(56) References Cited

U.S. PATENT DOCUMENTS 5,105,095 A 4/1992 Rudy et al.
5,435,512 A 7/1995 Rudy et al.
(Continued)

FOREIGN PATENT DOCUMENTS

EP 0997989 A2 5/2000
JP 2001060480 A 3/2001
(Continued)

OTHER PUBLICATIONS

Search Report issued in European Patent Application No. 22204483.6; Application Filing Date Oct. 28, 2022; Date of Mailing Mar. 28, 2023 (13 pages).
(Continued)

*Primary Examiner* — Justin M Kratt
(74) *Attorney, Agent, or Firm* — CANTOR COLBURN LLP

(57) ABSTRACT

A network connector and method for making a network connector. The connector includes a core body, and first and second sets of contacts supported by the core body. Each of the of contacts having an exposed portion extending outside of the core body. Wires are coupled to the first and second sets of contacts. An internal printed circuit board is supported on the core body. The internal printed circuit board is coupled to the exposed portions of the first set of contact. A
(Continued)

magnetic isolation component supported on the core body configured to filter electrical signals of the plurality of wires. The exposed portions of the second set of contacts are configured to engage an external printed circuit board.

28 Claims, 6 Drawing Sheets

(51) Int. Cl.

| | |
|---|---|
| ***H01F 27/28*** | (2006.01) |
| ***H01R 12/72*** | (2011.01) |
| ***H01R 13/02*** | (2006.01) |
| ***H01R 13/05*** | (2006.01) |
| ***H01R 13/648*** | (2006.01) |
| ***H01R 13/6581*** | (2011.01) |
| ***H01R 43/20*** | (2006.01) |
| *H01R 13/40* | (2006.01) |
| *H01R 13/6582* | (2011.01) |
| *H01R 13/6594* | (2011.01) |
| *H01R 13/66* | (2006.01) |
| *H01R 13/719* | (2011.01) |
| *H01R 43/00* | (2006.01) |

(52) U.S. Cl.

CPC ....... *H01F 27/2823* (2013.01); *H01R 12/722* (2013.01); *H01R 13/02* (2013.01); *H01R 13/05* (2013.01); *H01R 13/648* (2013.01); *H01R 13/6581* (2013.01); *H01R 43/20* (2013.01); *H01R 12/724* (2013.01); *H01R 13/40* (2013.01); *H01R 13/6582* (2013.01); *H01R 13/6594* (2013.01); *H01R 13/665* (2013.01); *H01R 13/6658* (2013.01); *H01R 13/719* (2013.01); *H01R 43/00* (2013.01); *H01R 43/205* (2013.01)

(58) Field of Classification Search

CPC .. H01R 13/6581; H01R 43/20; H01R 12/724; H01R 13/40; H01R 13/6582; H01R 13/6594; H01R 13/665; H01R 13/6658; H01R 13/719; H01R 43/00; H01R 43/205; H01F 27/24; H01F 27/28; H01F 27/2823

See application file for complete search history.

(56) References Cited

U.S. PATENT DOCUMENTS

| | | | | |
|---|---|---|---|---|
| 5,628,653 | A | 5/1997 | Haas et al. | |
| 6,062,908 | A | 5/2000 | Jones | |
| 6,705,879 | B2 | 3/2004 | Engel et al. | |
| 6,743,052 | B1 | 6/2004 | Lin et al. | |
| 6,840,817 | B2 | 1/2005 | Chen | |
| 6,926,558 | B2 | 8/2005 | Sasai et al. | |
| 7,153,163 | B2 | 12/2006 | Lewis et al. | |
| 7,674,136 | B2 | 3/2010 | Steinke et al. | |
| 8,693,497 | B2 | 4/2014 | Wei et al. | |
| 8,992,248 | B2 | 3/2015 | O'Malley et al. | |
| 9,172,189 | B2 | 10/2015 | Gao et al. | |
| 9,401,561 | B2 * | 7/2016 | Zhou .................. | H01R 13/7193 |
| 2011/0167869 | A1 | 7/2011 | Geers et al. | |
| 2013/0130561 | A1 | 5/2013 | Regnier | |

FOREIGN PATENT DOCUMENTS

| | | | |
|---|---|---|---|
| JP | 2004186099 | A | 7/2004 |
| JP | 2011523541 | A | 8/2011 |
| JP | 2013510406 | A | 3/2013 |

OTHER PUBLICATIONS

Modular Jack With Integrated Magnetics—RJMG Series—1xN; www.amphenol-icc.com, 3 pages; 2018.

ND9 Series, ix Industrial Ethernet Connectors, Product Specification S6168C Rev1.5; www.amphenolcanada.com, 6 pages; Jun. 2019.

Official Action issued in Japanese Patent Application No. 2022174513; Application Filing Date Oct. 31, 2022; Date of Mailing Nov. 13, 2023 (24 pages).

Office Action issued in Japanese Patent Application No. 2022-174513; Application Filing Date Oct. 31, 2022; Date of Mailing Jun. 24, 2024 (8 pages).

Office Action issued in Canadian Patent Application No. 3180365; Application Filing Date Oct. 28, 2022; Date of Mailing Apr. 9, 2024 (6 pages).

Canadian Office Action for 3180365; Issued Apr. 9, 2024; pp. 1-6.

* cited by examiner

HIGH-SPEED NETWORK CONNECTOR WITH INTEGRATED MAGNETICS

BACKGROUND

The disclosure relates generally to a network connector and more particularly to a high-speed network connector with magnetics integrated into the connector.

In certain applications, Ethernet data travels via a transmission medium (e.g., an Ethernet UTP cable), through an Ethernet/network connector, and is then transferred via a media dependent interface (MDI) to a physical layer (PHY) or printed circuit board of a connected device (e.g. a computer or server). A transformer is usually positioned between the transmission medium and the connected device, to regulate (i.e., isolate) electrical energy transferred from the transmission medium to the connected device. The transformers are typically separate from the network connectors and thus take up valuable space on the printed circuit board. IEEE 802 is a set of local area network (LAN) technical standards that specify the media access control (MAC) and physical layer (PHY) protocols for implementing wireless local area network (WLAN) computer communication. The IEEE 802 standards also establish a Data Terminal Equipment (DTE) Power via Media Dependent Interface (MDI), which is the international standard that defines the transmission of power over an Ethernet infrastructure.

One type of Ethernet connector is the IX INDUSTRIAL connector, which is a high-speed network connector that features a small robust design for use in industrial environments and industrial equipment. The IX INDUSTRIAL connector is a multi-purpose, small-sized I/O connector for industrial machinery. The IX INDUSTRIAL connector conforms to IEC Standard (IEC 61076-3-124), supports high speed data transmission, and has high EMC resistance. One such IX INDUSTRIAL connector, for example, is offered by Amphenol IC.

Ethernet standards (set by the IEEE) state that the physical layer must be galvanically isolated from the transmission medium. That is, Ethernet standards require electrical isolation transformers to be positioned between connected devices and the PHY chip which drives the signals to the connected devices. There are two fundamental reasons for this isolation requirement. The first is due to the possible ground offset between devices that are located far away from each other. The second is to protect all devices from line failures, such as a short to a high-voltage rail, a surge-spike, or an electro-static discharge ESD strike. However, because ethernet connectors, such as the IX INDUSTRIAL connector, have no transformers as part of the connector for isolating electronic signals, a separate transformer is positioned between the connector and the transmission medium.

SUMMARY

An aspect of this disclosure is a network connector that comprises a core body that has a front end, a rear end, and a longitudinal middle portion extending between the front end and the rear end. The middle portion has at least one side support surface. A first set of contacts are supported by the core body. Each of the of contacts of the first set of contacts has an exposed portion extending outside of the core body. A second set of contacts supported by the core body. Each of the of contacts of the second set of contacts has an exposed portion extending outside of the core body. A plurality of wires, wherein each of the wires can be coupled to the first and second sets of contacts. An internal printed circuit board supported on the core body. The internal printed circuit board can be coupled to the exposed portions of the first set of contacts. A magnetic isolation component can be supported on the core body configured to filter electrical signals of the plurality of wires. The exposed portions of the second set of contacts are configured to engage an external printed circuit board.

In certain examples, the magnetic isolation component includes magnetic cores and each magnetic core is wrapped by at least one of the plurality of wires, and the magnetic cores are mounted to at least one side support surface of the middle portion of the core body. In some examples, the magnetic cores are mounted to a second side support surface of the middle portion of the core body, wherein the second side support surface is opposite to the at least one side support surface of the core body. In other examples, the magnetic cores include at least one isolation transformer and at least one a common mode choke. In some examples, the side support surface is substantially flat. In certain examples, a length of the middle portion is at least twice a width of the front and rear ends. In some examples, the side support surface of the core body has a cavity and the magnetic cores are sized to fit within each cavity. In other examples, the magnetic cores include a first isolation transformer and a first common mode choke paired together and include a second isolation transformer and a second common mode choke paired together. In some examples at least one of the magnetic cores has an outer diameter in the range of 4.40 mm to 4.80 mm and a thickness in the range of 1.55 mm to 1.95 mm. The magnetic isolation component may be secured to the at least one side support surface of the core by a resin or an epoxy.

In other examples, the connector further comprises a shield that at least partially surrounds the housing shell; the shield includes at least a top wall and opposite side walls, the top wall is configured to cover a top of the housing shell and the side walls are configured to cover opposite sides of the housing shell; the connector further comprises a mating interface piece coupled to the front end of the core body, wherein mating contacts of the mating interface piece are coupleable to the internal printed circuit board; the front end of the core body includes an engagement feature for engaging a corresponding engagement feature of the mating interface piece; the plurality of contacts extend in a direction generally perpendicular to a longitudinal axis of the core body; the plurality of contacts are coupled to the core body by an interference fit; and/or the connector further comprises at least one power wire and at least one grounding wire connected between the first and second sets of contacts for providing a power line and a grounding path, respectively.

Another aspect of this disclosure is an electrical connector that comprises a housing shell that has an interior receiving area and an open bottom, a core body that is received in the interior receiving area of the housing shell, and first and second sets of contacts supported by the core body. Each of the contacts of the first set of contacts has an exposed portion that extends outside of the core body. Each of the contacts of the second set of contacts has an exposed portion that extends outside of the core body and extends through the open bottom of the housing shell. An internal printed circuit board can be supported on the core body. The internal printed circuit board can be coupled to the first set of contacts. An isolator can be mounted on the core body between the first set of contacts and the second set of contacts. A shield at least partially surrounds the housing shell.

In some examples, the core body includes a front end, a rear end, and a longitudinal middle portion extending between the front and rear ends, and the isolator is mounted on at least one support side surface of the middle portion; a length of the middle portion is at least twice a width of the front and rear ends, and the at least one side support surface is substantially flat; the at least one side support surface has a cavity and the isolator is configured to fit within the cavity; and/or the shield includes at least a top wall and opposite side walls, the top wall is configured to cover a top of the housing shell and the side walls are configured to cover opposite sides of the housing shell.

Yet another aspect of this disclosure is a method of manufacturing a network connector, that comprises the steps of loading a plurality of contacts onto a core body of the network connector; wrapping one or more wires around a magnetic isolation component, the one or more wires being coupled to the plurality of contacts; mounting the magnetic isolation component on the core body; coupling an internal printed circuit board to the plurality of contacts of the core body; and assembling a shield over the subassembly of the core body, the plurality of contacts, the magnetic isolation component, and the internal printed circuit board, such that the shield at least partially surrounds the subassembly In certain examples, the method further comprises the step of inserting the subassembly into a housing shell prior to the step of assembling the shield over the subassembly of the core body, the plurality of contacts, the magnetic isolation component, and the internal printed circuit board. The method may further comprise the step of coupling a mating interface piece with a front end of the core body and coupling the internal printed circuit board to mating contacts of the mating interface piece. In some examples, the step of assembling the shield includes the shield covering a top of the housing shell and covering opposite sides of the housing shell. The method may further comprise the step of coupling at least one power wire to the plurality of contacts to provide at least one power line. In some examples, the method further comprises the step of coupling at least one grounding wire to the plurality of contacts to provide at least one grounding path.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1A:
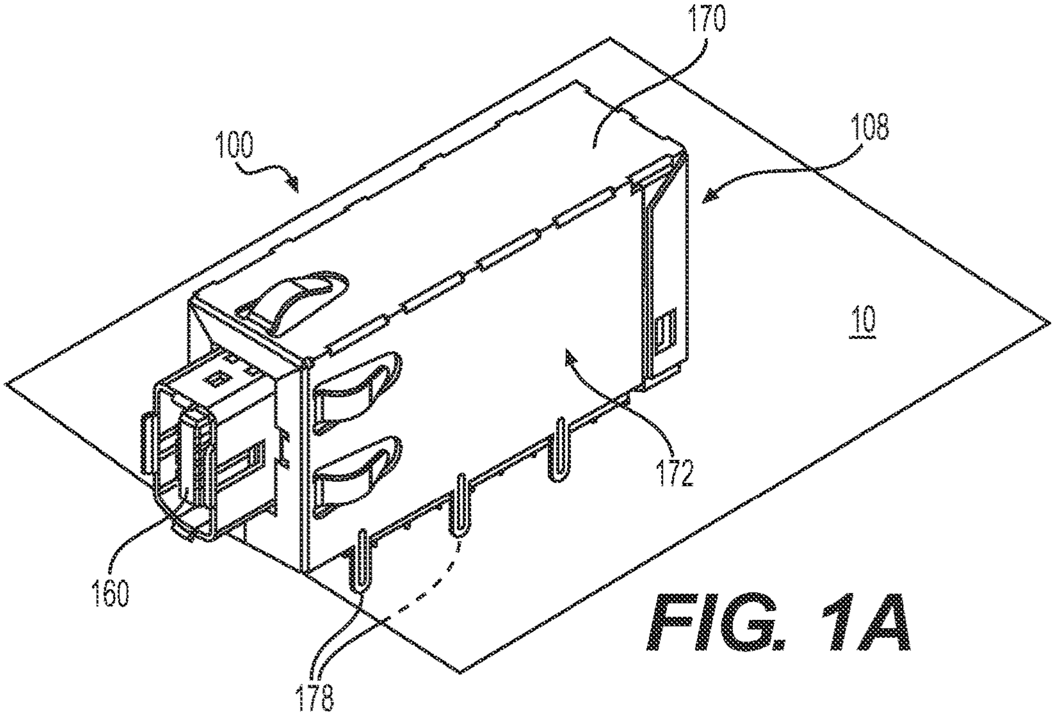
FIGS. 1A and 1B are top and bottom perspective views, respectively, of an exemplary network connector according to the present disclosure.

The present disclosure relates to a high-speed network connector that includes integrated magnetics. In an example of the present disclosure, the connector may be any network connector, such as a ruggedized industrial connector, like the IX INDUSTRIAL connector. The connector can be A-coded or B-coded connectors to meet the needs of a particular data or signal application. The connector can have a compact design that allows the connector to be used on smaller devices and/or to create multiple connection points in a limited space or area. The design of the connector can also be robust for a secure connection to a mating connector, such as via a metal locking tab that is less likely to break if bumped or pulled. And, in an example, the connector also has shielding capability to block interference, such as from nearby connectors or equipment.

The connector of the present disclosure uses transformer isolation via integrated magnetics. In an example, certain magnetic components that are typically located on a PCB are instead integrated into the design of the connector itself. The integrated magnetics may provide electrical isolation between two circuits by transferring energy in magnetic form from one circuit to another and by physically and electrically isolating the two circuits. That is, the integrated magnetics may isolate the electronic circuits to protect against electrical shock from the main lines and at the same time transfer electrical energy from one circuit to the other through magnetic coupling. As contemplated by the present disclosure, transformer isolation via the integrated magnetics may have a number of advantages when used in Ethernet applications, including for example, that: (a) there is no need for a voltage supply on the isolated side because the signal is directly transferred over the transformer; (b) transformers can accommodate fast Ethernet signals (even 10 Mbps) and are cheaper and easier to obtain than other isolation methods, such as use of optoisolators; (c) by their very nature, transformers have a very high Common-Mode Rejection Ratio (CMRR), which makes them optimal for differential communications; (d) any common-mode voltage applied to both terminals of the transformer is rejected, and only a differential voltage between terminals is transferred across to the isolated side; (e) any impedance mismatch between the cable pairs and the MDI pairs is overcome, thereby allowing the signal to be transferred without any reflection due to matched impedances; and (f) high isolation voltage protection (the standard requires immunity to 1500 VAC at 50/60 Hz for 60 seconds between pairs or from one pair to chassis ground) is provided, which protects the PHY or printed circuit board (PCB) side from the effects of ESD strikes.

Integrating the magnetics into the connector may also have several other advantages, including: reducing the manufacturing cost of the connector and/or the associated PCB due to a lower BOM item count; simplifying the assembly of the connector and associated PCBs in the sense that the connector is ready to use without having to separately mount the magnetics on the associated PCB; and simplifying the layout and design of the connector and PCB to reduce the risk of manufacturing mistakes. For example, for mass-produced commercial network systems, using a connector with integrated magnetics may reduce manufacturing costs and simplify the design process.

Turning to the drawings, FIGS. 1-8 show an example of a network connector 100 with a subassembly 101 that includes a core body 102, a plurality of contacts 104*a*, 104*b*, an internal printed circuit board 106, and a magnetic isolation component 110. A plurality of wires 116*a* (FIG. 6) are coupled to the contacts 104*a*, 104*b* to provide the signal pathways (FIG. 9) through the connector 100. The wires 116*a* wrap around the magnetic isolation component 110, for example, to create a signal filter for the signal pathways to protect associated devices, such as from line failures, a short to a high-voltage rail, a surge-spike, or an electro-static discharge ESD strike. Although the connector 100 is shown as a right-angle type connector, the connector 100 may also be a vertical type connector or other connector orientation.

The core body 102 has a front end 120, a rear end 122, and a longitudinal middle portion 124 extending between the front end 120 and the rear end 122. The longitudinal middle portion 124 has a planar top 128, a planar bottom 130, and a planar dividing panel 125 having opposing side surfaces 126*a* and 126*b* (also referred to as "side support surfaces"). The top 128 and bottom 130 extend in planes that are substantially parallel to each other, and the dividing panel extends between the top 128 and bottom 130 in a plane that is substantially orthogonal to the planes of the top and bottom 128, 130. The side surfaces 126*a*, 126*b* are configured to support the magnetic isolation component 110. The opposing side surfaces 126*a* and 126*b* can be substantially identical in one example. In other examples, the opposing side surfaces 126*a* and 126*b* can be different. One or both side support surfaces 126*a* and 126*b* can be recessed to form a respective cavity 144*a*, 144*b*, as seen in FIGS. 5, 7B, 7C.

Figure 10:
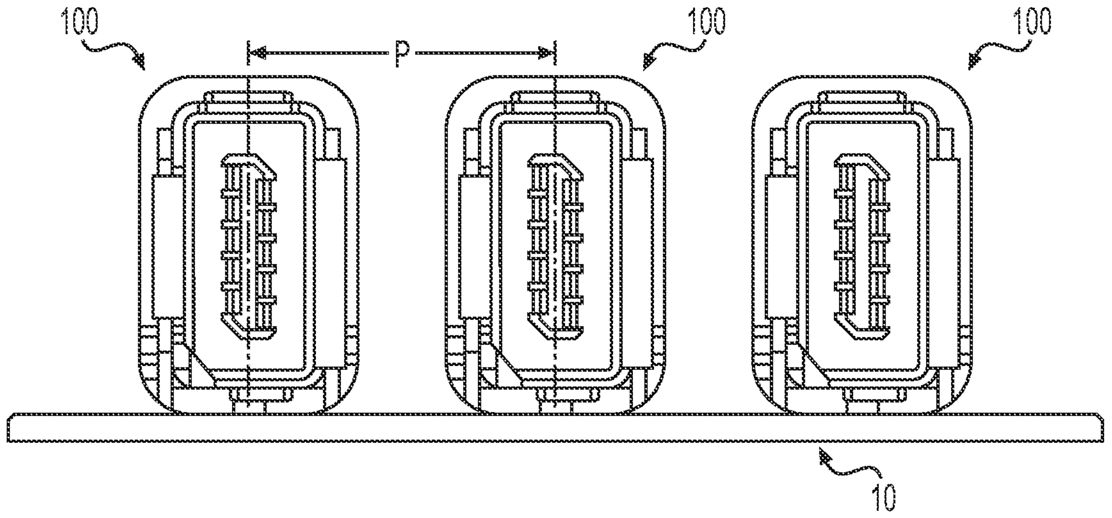
FIG. 10 is a front elevational view of multiple connectors of the present disclosure mounted on a printed circuit board, showing the pitch between the connectors.

The plurality of contacts 104*a*, 104*b* are supported by the core body 102. In an example, the plurality of contacts 104*a*, 104*b* are loaded onto the core body 102 and are coupled thereto, such as by an interference fit. The plurality of the contacts 104*a*, 104*b* can comprise a first set of contacts 104*a* for coupling to the internal printed circuit board 106 and a second set of contacts 104*b* for coupling to a main external printed circuit board 10 (FIGS. 1A and 10). Each of the contacts of the first set of the contacts 104*a* has an exposed portion 132 (also referred to as a "post") that extends outside of the core body 102, such as at a top 128 of the core body 102. Each of the contacts of the second set of contacts 104*b* has an exposed portion 134 (also referred to as a "post") that extends outside of the core body 102, such as at a bottom 130 of the middle portion 124 of the core body 102.

Figure 2:
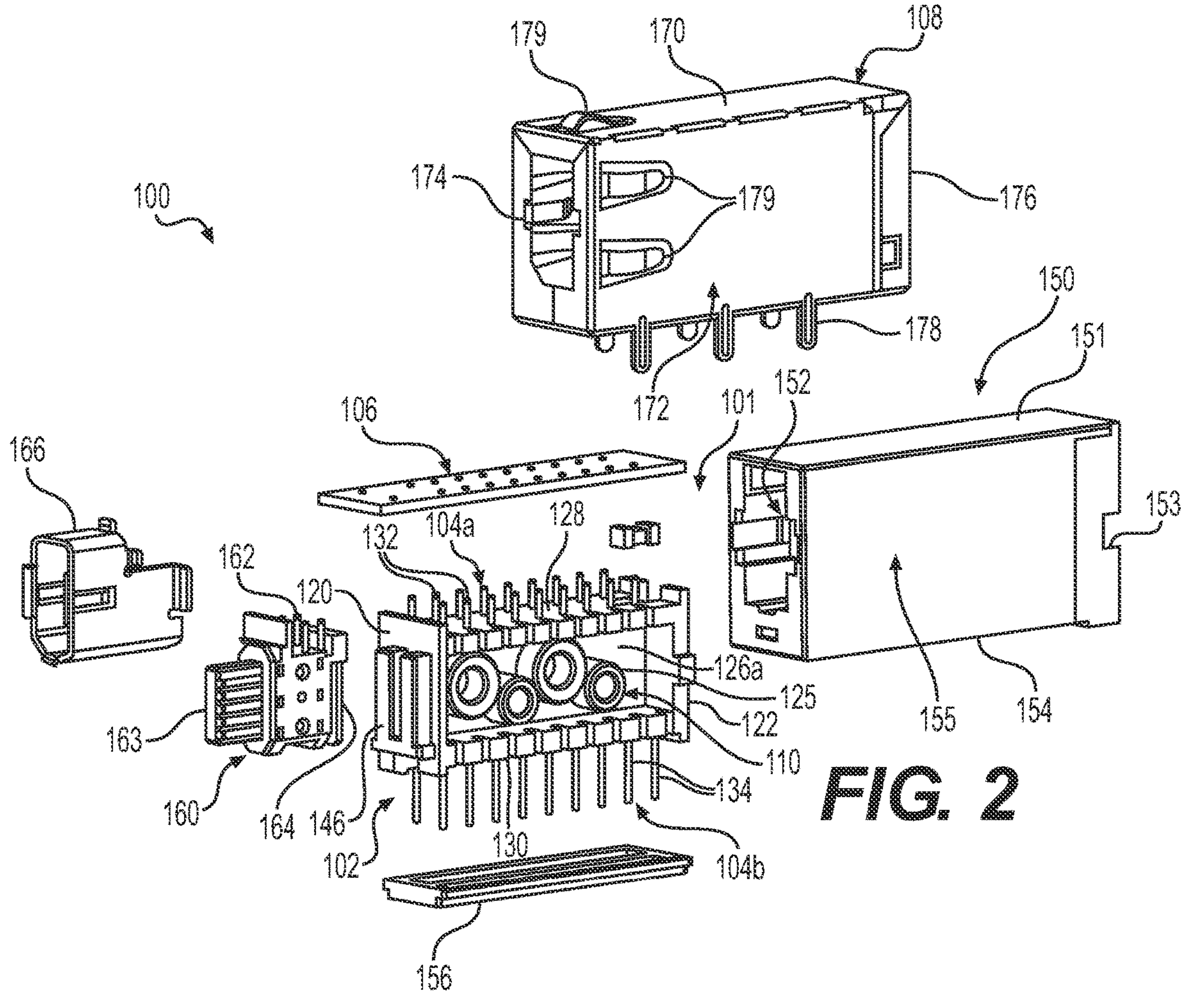
FIG. 2 is an exploded perspective view of the connector illustrated in FIGS. 1A and 1B.
Figure 5:
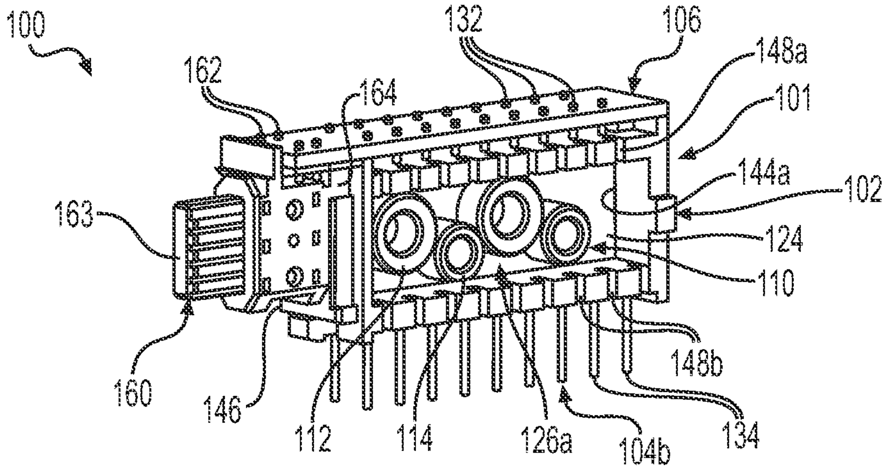
FIG. 5 is a perspective view of a subassembly of the connector illustrated in FIGS. 1A, 1B, and 2.

As seen in FIGS. 2 and 5, the internal printed circuit board 106 is supported on the core body 102, such as at the top 128 of the core body 102, and couples to the exposed portions or posts 132 of the first set of contacts 104*a*. In other examples, the internal printed circuit board 106 may be positioned at other locations with respect to the core body 102. For example, the printed circuit board 106 may be located at the bottom 130.

Figure 7A:
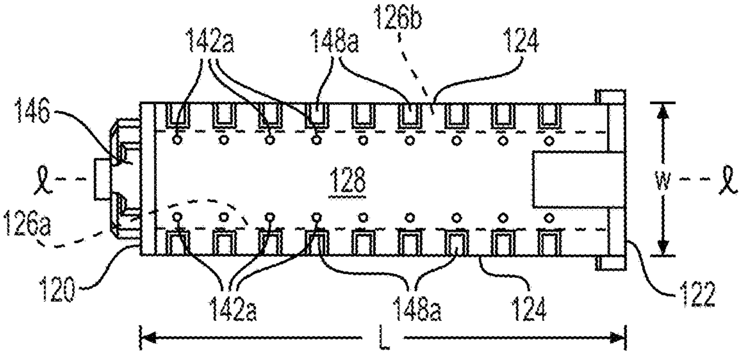
FIG. 7A is a top plan view of a core body of the connector illustrated in FIGS. 1A, 1B, and 2.
Figure 7B:
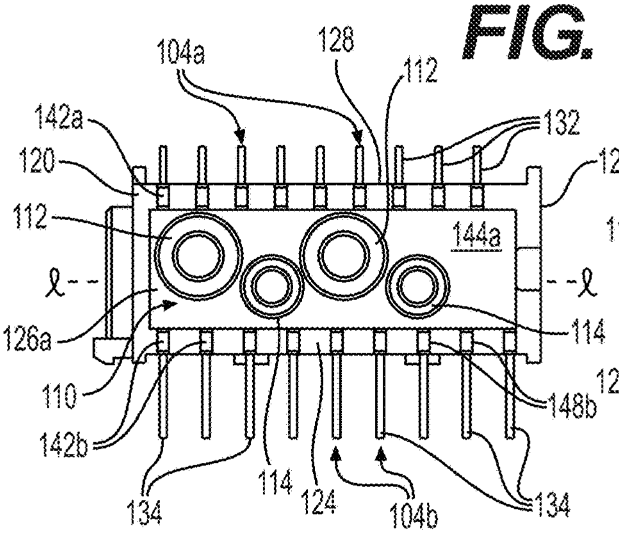
FIG. 7B is a left side elevational view of the core body illustrated in FIG. 7A, showing contacts supported by the core body.
Figure 7C:
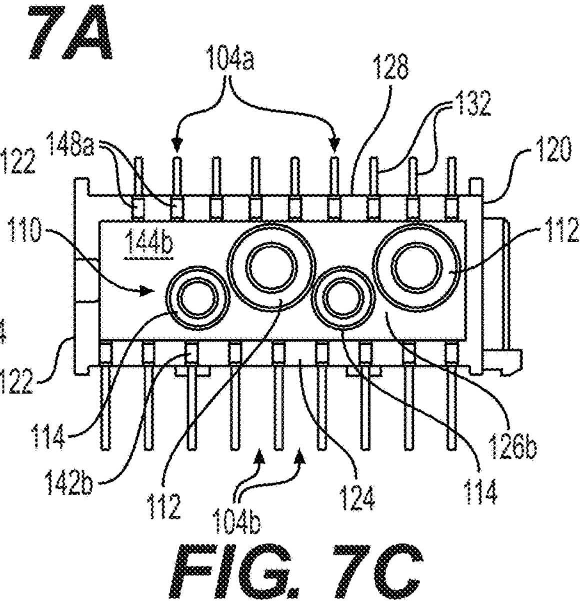
FIG. 7C is a right side elevational view of the core body illustrated in FIGS. 7A and 7B, showing contacts supported by the core body.
Figure 7D:
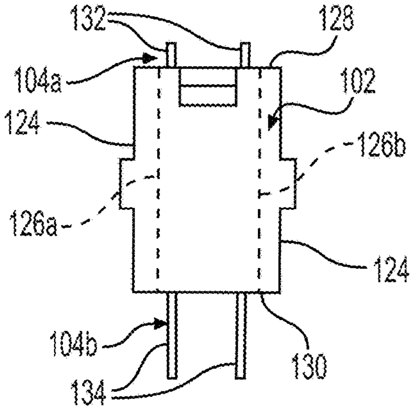
FIG. 7D is a rear end elevational view of the core body illustrated in FIGS. 7A-7C, showing contacts supported by the core body.

The magnetic isolation component 110 is supported on the core body 102, such as on one or both of the side support surfaces 126*a* and 126*b* in their respective cavities 144*a*, 144*b*, as seen in FIGS. 7B and 7C. As noted above, the subassembly 101 of the connector 100 includes the contacts 104*a*, 104*b* loaded onto the middle portion 124 of the core body 102, the magnetic isolation component 110 mounted to the side support surfaces 126*a* and 126*b* (only side support surface 126*a* is shown) of the core body 102, and the internal printed circuit board 106 mounted to the top 128 of the core body 102, as seen in FIG. 5. A housing shell 150 of the connector 100 receives the subassembly 101.

In an example, the core body 102 is generally rectangular in shape and is formed of any dielectric material. In other examples, the core body 102 may be other shapes, such as square, cuboid, and the like. The middle portion 124 of the core body 102 can be elongated (as compared to the length of the conventional IX INDUSTRIAL connector, for example), such that a length L of the middle portion 124 is at least twice a width W of the front and rear ends 120 and 122 of the core body 102, as seen in FIG. 7A. In other examples, the length L may be more or less than twice the width W.

As seen in FIGS. 7A-7D, the top 128 and bottom 130 of the middle portion 124 of the core body 102 each includes a number of respective through-holes 142*a*, 142*b*, where each through-hole 142*a*, 142*b* receives one of the contacts of the first and second sets of contacts 104*a*, 104*b*, such as in an interference fit. Each contact 104*a*, 104 extends through a respective through-hole 142*a*, 142*b*, such that the exposed portions or posts 132 of the first set of contacts 104*a* are exposed at the top 128 of the core body 102 for coupling to the internal printed circuit board 106 (FIG. 2), and the exposed portions or posts 134 of the second set of contacts 104*b* are exposed at the bottom 130 of the core body 102 for coupling to the main external printed circuit board 10 (FIG. 1A). The first and second sets of contacts 104*a*, 104*b* extend in a direction generally perpendicular to a longitudinal axis $\ell$ of the core body 102, as seen in FIGS. 7B and 7C.

Figure 6:
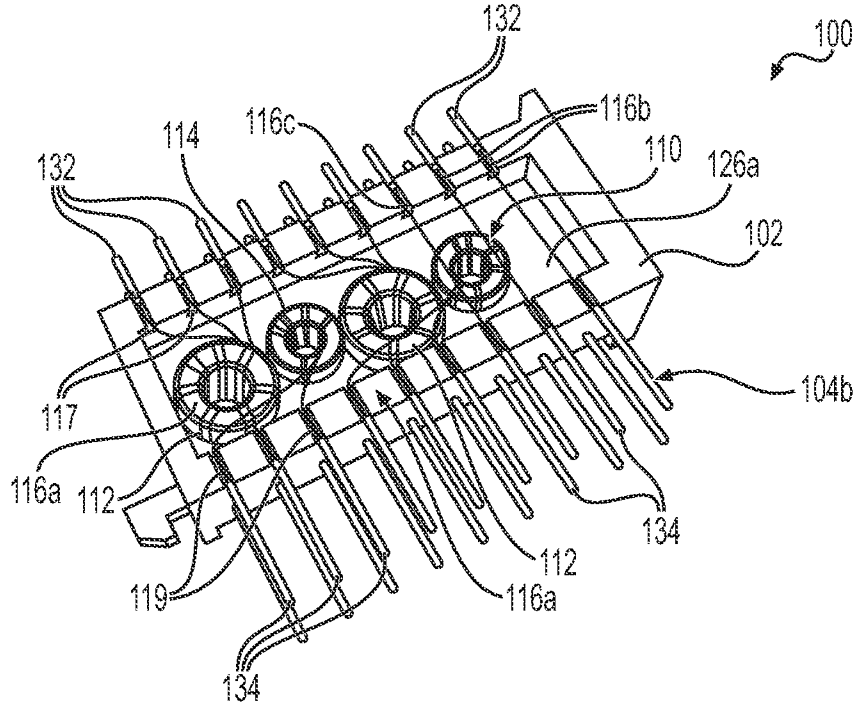
FIG. 6 is an image of internal components of the connector illustrated in FIGS. 1A, 1B, and 2, showing a magnetic isolation component and wiring of the connector.

The cavities 144*a*, 144*b* formed at each of the side support surfaces 126*a* and 126*b* of the core body 102 are sized to receive the magnetic isolation component 110. In an example, each of the support surfaces 126*a* and 126*b* can be substantially flat for mounting the magnetic isolation component 110 thereon. Although two cavities 144*a*, 144*b* are illustrated, the core body 102 may have more or less than two cavities 144*a*, 144*b*. For example, in some examples the core body 102 has a single cavity that holds the magnetic isolation component 110. In other examples, the two cavities 144*a*, 144*b* are subdivided by one or more walls (e.g., the walls may be integral with the core body 102 and/or made of the same dielectric material as the core body 102) so that each pair of magnetic cores is separated from an adjacent pair of magnetic cores by a wall. Slots 148*a*, 148*b* (FIGS. 5 and 7A) can be provided in the top 128 and bottom 130, respectively, of the longitudinal middle portion 124 of the core body 102 above and below the cavity 144*a*, 144*b*. The slots 148*a*, 148*b* are sized and positioned to respectively receive one of the ends 117 or 119 of the wires 116*a*, as seen in FIG. 6.

Figure 4:
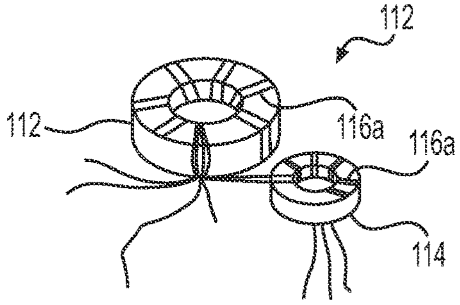
FIG. 4 is a perspective view of a pair of exemplary magnetic cores.

In an aspect, the magnetic isolation component 110 can be a plurality of magnetic cores (e.g., a core of ferromagnetic material), such as cores 112, 114, around which the wires 116*a* can be wrapped. The wires 116*a* that are wrapped around the cores 112, 114 are coupled to the first and second sets of contacts 104*a*, 104*b* (e.g., both electrically and mechanically) at the ends 117 and 119, respectively, of the wires 116*a*. In an example, the cores 112, 114 are paired together, as seen in FIG. 4. In some examples, a wire is first wrapped around the core 112 and then wrapped around the core 114, or vice versa. The core 112 (T1) can be an isolation transformer that allows high speed signals to go through, but rejects DC signals. The core 114 (T2) can be the common mode choke that is an electrical filter that blocks high frequency noise common to two or more data or power lines while allowing the desired DC or low-frequency signal to pass. Thus when paired together, the cores 112, 114 complement one another to filter the signals passing through a wire that extends between a pair of contacts 104*a*, 104*b*. Thus, a wire may extend from a contact 104*a*, wrap around a core 112, wrap around a core 114, and then couple with a contact 104*b*. Referring to FIG. 7B, in an example the magnetic isolation component 110 can include at least first and second pairs of the cores 112, 114. The first pair of cores 112, 114 comprises a first isolation transformer (T1) and a first common mode choke (T2) paired together and the second pair of cores 112, 114 comprises a second isolation transformer (T1) and a second common mode choke (T2) paired together. Referring to FIG. 7C, the magnetic isolation component 110 can also include third and fourth pairs of the cores 112, 114 comprising a first isolation transformer (T1) and a first common mode choke (T2) paired together and a second isolation transformer (T1) and a second common mode choke (T2) paired together.

In some embodiments of the disclosure, two pairs of the paired together cores 112 and 114 are mounted in the cavity 144*a* at one side support surface 126*a* of the dividing panel 125 of the middle portion 124 of the core body 102, as seen in FIG. 7B, and two other pairs of the paired together cores 112 and 114 are mounted in the cavity 144*b* at the other side support surface 126*b* of the dividing panel 125 of the middle portion 124 of the core body 102, as seen in FIG. 7C. The cores 112 and 114 can be mounted in each cavity 144 in a vertical orientation, aligned with the dividing panel 125. In other examples, the cores 112 and 114 can be mounted in each cavity 144 in orientations other than a vertical orientation, as long as the cores 112 and 114 fit within the dimensions of the cavity 144. The cores 112 and 114 can be mounted into each cavity 144 via an epoxy, resin, or the like, for example the cores 112 and 114 can be adhered to the side surfaces 126*a*, 126*b*. In another example, the cores 112 and 114 can be mounted on one or both of the side support surfaces 126*a* and 126*b* of the core body 102 and encapsulated in resin, for example, which can protect the magnetic isolation component 110 from moving around during the life of the connector and also helps provide dielectric isolation. In another example, only one pair of the cores 112 and 114 can be provided on one or both of the side support surfaces 126*a* and 126*b*.

Figure 3A:
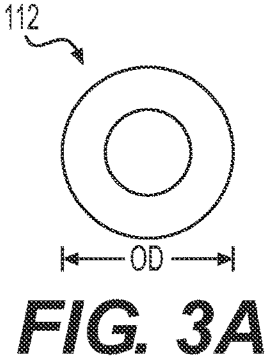
FIGS. 3A and 3B are elevational and cross-sectional views, respectively, of an exemplary magnetic core.
Figure 3B:
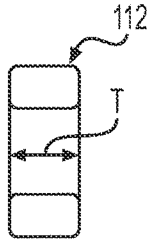

Each core 112 can have an increased outer diameter OD and a reduced thickness T (as compared to conventional magnetic cores), as seen in FIGS. 3A and 3B, such that the core 112 fits within the dimensions of the cavity 144 of the core body 102. In an example, the increased outer diameter OD of each core 112 (i.e. increased from the standard magnetic core outer diameter of 3.68 mm) may be in the range of 3.70 mm to 5.00 mm, or in another example, the range may be 4.00 mm to 4.85 mm, or in still another example, the range may be 4.40 mm to 4.80 mm, such as about 4.60 mm. In an example, the reduced thickness T of each core 112 (i.e. reduced from the standard magnetic core thickness of 2.68 mm) may be in the range of 1 mm to 2.66 mm, or in another example, the range may be 1.25 mm to 2.50 mm, or in still another example, the range may be 1.55 mm to 1.95 mm, such as about 1.75 mm. The foregoing includes example dimensions, and the increased outer diameter OD and the thickness T can be other sizes in other examples.

Figure 1B:
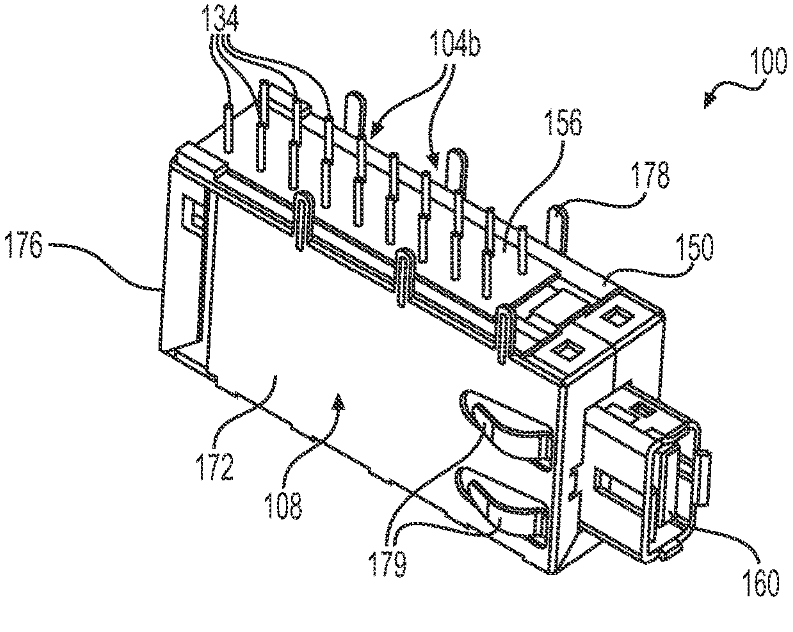

As best shown in FIG. 2, the connector 100 can further comprise a shield 108. The shield 108 can be configured to surround or at least partially surround the subassembly 101 and protect the same from electromagnetic interference. The connector 100 may also include a housing shell 150 that receives the subassembly 101 and is covered or at least partially covered by the shield 108. The housing shell 150 may include a top 151, opposite sides 155, an interior receiving area 152 that is sized to receive the subassembly 101, a front end with an opening, an open rear end 153, and an open bottom 154. The open rear end 153 allows the subassembly 101 to be inserted into the interior receiving area 152 of the housing shell 150 when assembling the connector 100. The open bottom 154 allows the exposed portions 134 of the second set of contacts 104*b* to extend therethrough to couple to the external printed circuit board 10. A bottom cover 156 can optionally be provided at the open bottom 154 of the housing shell 150, and a rear cover can optionally be provided at the open rear end 153. In an example, the bottom cover 156 and rear cover can be made of any dielectric material. The exposed portions 134 of the second set of contacts 104*b* can also extend through the bottom cover 156, as seen in FIG. 1B.

In an example, the shield 108 can be made of a conductive material and can be configured to substantially surround the housing shell 150 and the subassembly 101 of the core body 102, the contacts 104 (with the exception of the exposed portions or posts 134 which are configured for attachment to an external PCB), the internal printed circuit board 106, and the magnetic isolation component 110 to provide a generally 360 degree EMI shielding for the connector 100 when the connector 100 is mounted on the external printed circuit board 10. In another example, the shield 108 can only partially surround the housing shell 150 and the subassembly 101 to provide the partial EMI shielding. The shield 108 may comprise a top wall 170 and opposite longitudinal sidewalls 172 extending between front end 174 (having an opening) and a rear wall 176 of the shield 108. The top wall 170 of the shield 108 can be sized to generally cover the top 151 of the housing shell 150 and the sidewalls 172 can be sized to generally cover the sides 153 of the housing shell 150. The rear wall 176 of the shield 108 can be closed onto the open rear end 153 of the housing shell 150 when assembling the shield 108 on the housing shell 150. In an example, the shield 108 can be formed of any conductive material. In other examples, portions of the shield 108 can be open and/or formed of a dielectric material. For example, one or more of the top wall 170 or the sidewalls 172 of the shield 108 can be removed, have a cut-out, and/or be formed of a dielectric or semi-conductive material instead of a conductive material. The shield 108 also includes one or more tails 178 at the bottom of the shield 108 for insertion into the external printed circuit board 10 for electrical and mechanical connection thereto. The tails 178 connect to the ground circuit through the printed circuit board 10.

Both the housing shell 150 and the shield 108 can have a generally rectangular shape. In other examples, the housing shell 150 and the shield 108 can have other shapes, such as square, cuboid, and the like. As an option, one or more EMI fingers 179 can be provided on the top wall 170 and/or the side walls 172 of the shield 108 for grounding connection to a mating connector and/or a grounding connection to a neighboring connector 100 to form a common ground.

Figure 9:
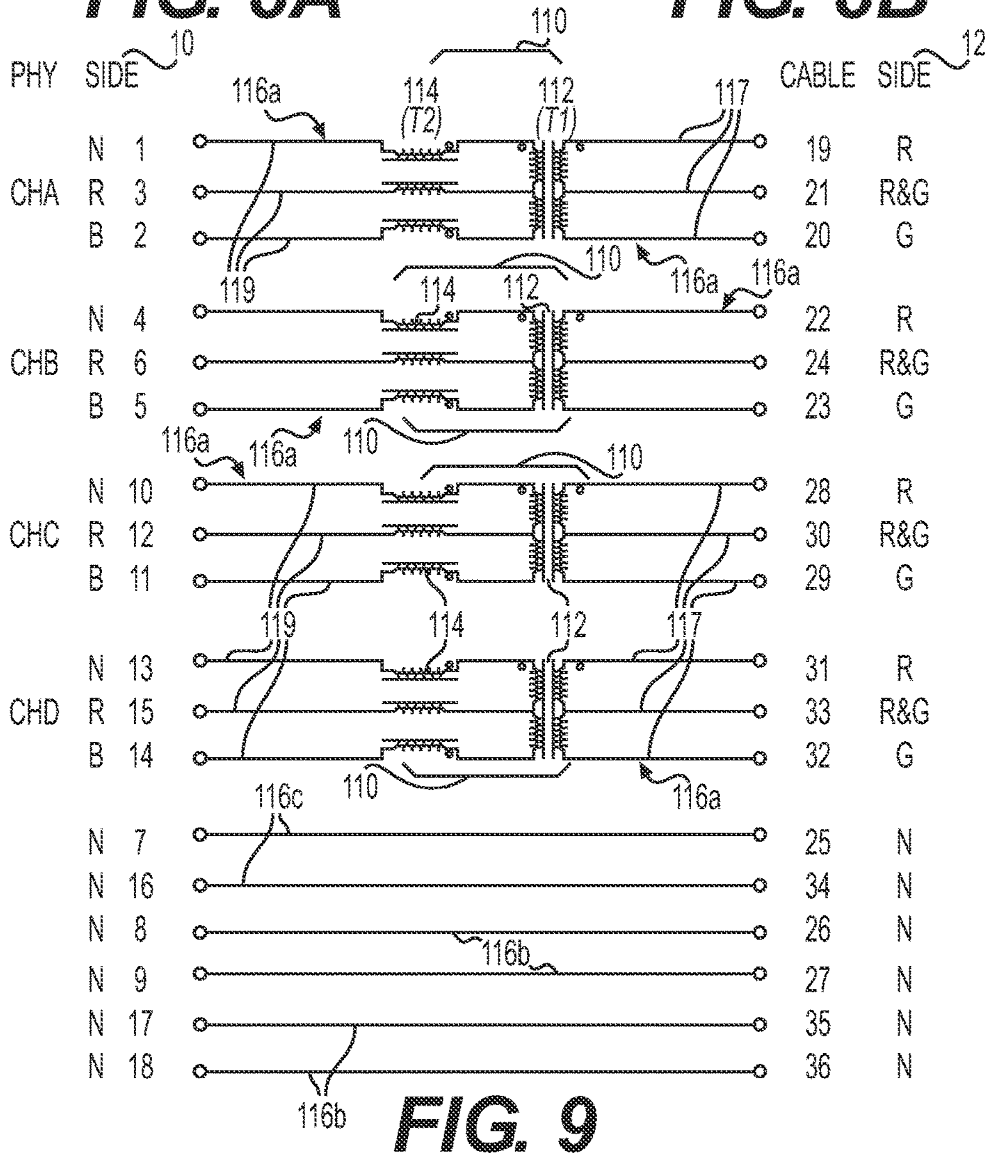
FIG. 9 is a schematic diagram of the circuitry of an exemplary connector, showing the circuitry pathways corresponding to the exemplary pin number designations of the contacts illustrated in FIGS. 8A and 8B.

Referring to FIGS. 2, 5, the connector 100 further includes a mating interface piece 160 that has a plurality of mating contacts 162 for coupling to the internal printed circuit board 106. The mating interface piece 160 is designed to connect with a mating connector, such as a cable plug (at the mating connector side 12, as seen in FIG. 9), thereby electrically connecting the mating connector to the main printed circuit board 10 through the connector 100. The mating interface piece 160 has an interface 163 that supports the mating contacts 162 for connection to corresponding contacts of the mating connector. The mating interface piece 160 is coupled to the front end 120 of the core body 102 in position to mate with the mating connector. The front end 120 of the core body 102 includes an engagement feature 146 for engaging a corresponding engagement feature 164 of the mating interface piece 160, as seen in FIGS. 2 and 5. In an example, the engagement feature 146 of the core body 102 can be a catch and the engagement feature of 164 of the mating interface piece 160 can be a tab or projection that slidably and removably engages the catch 146 of the core body 102. In other examples, the engagement features 146 and 164 can be any type of known mechanical engagement. An interface shield 166 (FIG. 2) can be provided that surrounds the mating interface piece 160 and electrically and mechanically connects with the shield 108.

An aspect of the present disclosure is a method of manufacturing or assembling a network connector, such as connector 100. The method may comprise the steps of loading the plurality of contacts 104*a*, 104*b* onto the core body 102 of the connector 100, mounting the magnetic isolation component 110 on the core body 102, and coupling the internal printed circuit board 106 to the plurality of contacts 104*a*, 104*b* of the core body 102. The shield 108 can be assembled over the subassembly 101 of the core body 102, the plurality of contacts 104*a*, 104*b*, the magnetic isolation component 110, and the internal printed circuit board 106, such that the shield 108 partially or substantially surrounds the subassembly 101 to provide shielding.

The method may also comprise the step of inserting the subassembly 101 into the housing shell 150, by inserting the subassembly 101 through the rear end 153 of the housing shell 150, prior to the step of assembling the shield 108 over the subassembly 101. The method can also comprise the step of coupling the mating interface piece 160 with the front end 120 of the core body 102, using the corresponding engagement features 146 and 164, and coupling the internal printed circuit board 106 to mating contacts 162 of the mating interface piece 160.

The individual contacts 104*a*, 104*b*, can be loaded into the core body 102 via the holes 142 (FIG. 7A) for an interference fit between the contacts 104*a*, 104*b* and the core body 102. The magnetic cores 112 and 114 of the magnetic isolation component 110 can be mounted in pairs on one or both of the side support surfaces 126*a* and 126*b* of the middle portion 124 of the core body 102. In an example, four pairs of the paired together cores 112, 114 can be mounted on the core body 102. For example, two pairs of the paired together cores 112, 114 can be mounted in each cavity 144*a*, 144*b* of each side support surface 126*a* and 126*b*. In other examples, all four pairs of the paired together cores 112, 114 can be mounted on just one of the side support surfaces 126*a* and 126*b* of the core body 102. In further examples, any number of cores 112 and 114 or any number of paired together cores 112, 114 can be mounted on one or both of the side support surfaces 126*a* and 126*b* of the core body 102. The paired-together cores 112 and 114 are connected, via wires 116*a*, to the first and second sets contact 104*a* and 104*b*, as shown in FIG. 9, with the magnetic cores 112 and 114 between the first and second sets of contacts 104*a* and 104*b*. In an example, the wires 116*a* can be soldered to the contacts 104*a*, 104*b*.

The mating interface piece 160 is coupled to the front end 120 of the core body 102 by engaging their respective engagement features 146 and 164. The internal circuit board 106 is positioned at the top 128 of the core body 102 and is coupled to both the exposed ends 132 of the first set of contacts 104*a* and to the mating contacts 162 of the mating interface piece 160. The subassembly 101 of the core body 102 loaded with the contacts 104*a*, 104*b* and with the mating interface piece 160 at the front end 120 thereof and the internal printed circuit board 106 at the top 128, is inserted into the housing shell 150 via the open rear end 153 of the housing shell 150. The mating shield 166 is added to the mating interface piece 160 and the bottom cover 156 is added to the open bottom 154 of the housing shell 150 with the exposed ends 134 of the second set of the contacts 104*b* extending through the bottom cover 156. Finally, the shield 108 can be assembled over the housing shell 150 to cover or partially cover the housing shell 150 including the open rear end 153 of the housing shell 150.

Figures 8A, 8B:
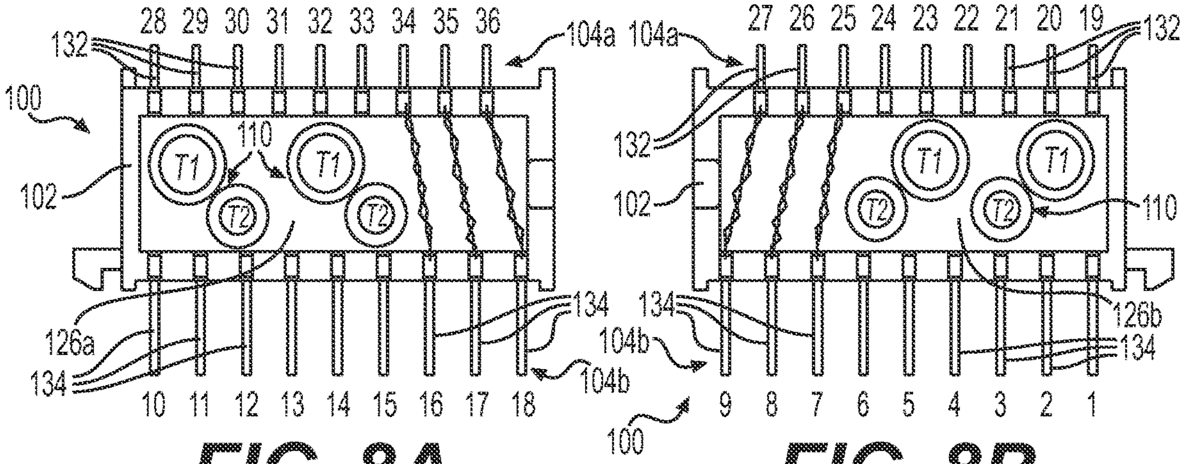
FIGS. 8A and 8B are left and right side views, respectively, of the core body, showing the contacts supported by the core body and an exemplary pin number designation for each contact.

FIGS. 8A and 8B illustrate left and right side views, respectively, of the core body 102, showing the first and second sets of contacts 104*a* and 104*b* supported by the core body 102 and showing the pin number designation for the exposed portions 132 and 134 of the contacts 104*a*, 104*b*. FIG. 9 illustrates a schematic diagram of the circuitry through the connector 100 between the main printed circuit board 10 (also referred to as "the printed circuit board side") and each of the mating connectors 12 (also referred to as the "mating connectors side"). The circuitry pathways illustrated in FIG. 9 correspond to the pin number designations of the contact posts 132 and 134 shown in FIGS. 8A and 8B. The magnetic cores 112 and 114, when wrapped by the wires 116*a*, provide a signal filter in the signal pathways between the first and second sets of contacts 104*a* and 104*b* to meet the isolation requirements of the current Ethernet standards. For example, four channels CHA, CHB, CHC, and CHD (as is required by 10GBASE-T Ethernet) can be provided for the circuit pathways. A channel is one of the differential signal pairs which carry the signals between the main printed circuit board 10 and the mating connectors side 12, such as cable plugs. Each channel CHA, CHB, CHC, and CHD includes one pair of the paired together cores 112 and 114 wrapped by the wires 116*a*, as seen in FIG. 9. In an example, three wires 116*a* may be wrapped around the cores 112 and 114 in each of the channels CHA, CHB, CHC, and CHD. In other examples, more or less than three wires may be used in each channel. In an example, for speeds of 1000BASE-T and above, four differential pairs/channels are used for each connector 100 and the four channels can accommodate typical network cabling for Ethernet (i.e. the mating connectors at the mating connectors side 12), which has four twisted/differential pairs (8 wires in total). In other examples, more or less than four channels can be used for the signal pathways of the connector 100.

One end 117 (also referred to as "the first end") of each wire 116*a* is electrically and mechanically coupled to the exposed portions or posts 132 of the first set of contacts 104*a*. The other end 119 (also referred to as "the second end") of each wire 116*a* is electrically and mechanically coupled to the exposed portions or posts 134 of the second set of contacts 104*b*. In an example, the first and second ends 117 and 119 of each of the wires 116*a* can be soldered to a respective contact post 132 and 134.

In operation, signals are transmitted between the main printed circuit board 10, through the connector 100 to a mating connector (at the mating connectors side 12) which is coupled to the connector 100 at the mating interface 160 of the connector 100. Signals from the printed circuit board side 10 are received by the exposed portions 134 of the second set of contacts 104*b* (which are electrically connected to the board 10 and which are loaded on the core body 102), and are then connected via wires 116*a* to the exposed portions 132 of the first set of contacts 104*a* to electrically connect with the internal printed circuit board 106. Between the connection of the wires to the contacts 104*b* and the contacts 104*a*, the wires are wound around the magnetic isolation component 110 (e.g. the magnetic isolation cores 112, 114), which filter the signals as described above. From the internal circuit board 106, the signals are then received by the mating interface piece 160 via the mating contacts 162 electrically coupled to the internal printed circuit board 106, which couples (electrically and mechanically) to a mating connector at the mating connectors side 12, which then receives the signals. Signals can travel through the connector 100 between the main printed circuit board 10 and the mating connectors side 12 along the signal pathways through the channels CHA, CHB, CHC, and CHD. For example, the signals from the printed circuit board side 10 can travel through the channels CHA, CHB, CHC, and CHD via the exposed contact portions or posts 134 and through the second ends 119 of the wires 116*a* (which are coupled to the posts 134), through the magnetic isolation component 110, including the pair of cores 112 and 114 around which the wires 116*a* are wrapped, through the first ends 117 of wires 116*a* to the exposed contact portions or posts 132 (to which the first ends 117 are coupled), and then to the mating connectors side 12.

In an aspect, the connector 100 can be configured to deliver power to the printed circuit board side 10 from the mating connectors side 12. In an example, one or more wires 116*b* for receiving and transmitting power (also referred to as "power wires"), may be included with the subassembly 101. Each power wire 116*b* can be coupled (electrically and mechanically) between the exposed portions 132 and 134 of the first and second sets of contacts 104*a* and 104*b* on the core body 102, as seen in FIGS. 6, 8A and 8B. The power wires 116*b* are separate from the wires 116*a* and are not associated with the magnetic isolation component 110. Rather, the power wires 116*b* provide a direct power line between the first and second sets of contacts 104*a* and 104*b*. For example, as seen in FIG. 9, the power wires 116*b* can directly connect pin numbers 8 and 26; can directly connect pin numbers 9 and 27; can directly connect pin numbers 17 and 35; and can directly connect pin numbers 18 and 36 of the first and second sets of contacts 104*a* and 104*b*. In an example, the power wires 116*b* are arranged on the core body 102 near the rear end 122 of the core body 102. The power wires 116*b* thus provide power lines (separate from the signal pathways) between the main printed circuit board 10 and the mating connectors side 12 to provide power over Ethernet capability.

In another aspect, one or more grounding wires 116*c* can be provided on the core body 102 for connection to the grounding plane of the main printed circuit board 10. Each grounding wire 116*c* is also coupled between the exposed portions 132 and 134 of the first and second sets of contacts 104*a* and 104*b*, as seen in FIGS. 6, 8A and 8B, and can be positioned near the rear end 122 of the core body 102 separate from the wires 116*a*. The grounding wires 116*c* are separate from the wires 116*a* and the power wires 116*b*, and are not associated with the magnetic isolation component 110. Rather, the grounding wires 116*c* provide a direct grounding path between the first and second sets of contacts 104*a* and 104*b*. For example, the grounding wires 116*c* can directly connect pin numbers 7 and 25 and can directly connect pin number 16 and 34 of the first and second sets of contacts 104*a* and 104*b*, as seen in FIG. 9.

FIG. 10 illustrates several of the connectors 100 mounted on the main external printed circuit board 10. The pitch P between the connectors 100 is defined as the distance between the respective centerlines of two adjacent connectors 100. A benefit of some examples is that the pitch P between the connectors 100 can be minimized where space on the main printed circuit board 10 is limited, while also having the required magnetics integrated into each of the connectors 100 on the board 10. Another benefit is that more space is made available on the board 10 because the required magnetics are no longer taking up space on the board and are instead integrated into each of the connectors 100. Yet another benefit is the elimination of the step of having to mount the required magnetics on the board in addition to mounting the connectors 100 because the magnetics are already integrated into each connector 100. In an example, the pitch P can be maintained in the range of about 9 mm to 14 mm, in the range of about 10 mm to 12 mm, in the range of about 10 mm to 11 mm, or can be maintained at 10 mm or less, or at about 10 mm.

In an example, the connector 100 may have a similar form to a conventional IX INDUSTRIAL connector and can be used instead of a conventional IX INDUSTRIAL connector. And, because the conventional IX INDUSTRIAL connectors lack isolating transformers, using the connector 100 instead of a conventional IX INDUSTRIAL connector eliminates the need to provide or mount such transformers on the printed circuit board, It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

It is noted that the description and claims may use geometric or relational terms, such as right, left, above, below, upper, lower, top, bottom, linear, arcuate, elongated, parallel, perpendicular, flat, rectangular, cuboid, etc. These terms are not intended to limit the disclosure and, in general, are used for convenience to facilitate the description based on the examples shown in the figures. In addition, the geometric or relational terms may not be exact. For instance, walls may not be exactly perpendicular or parallel to one another because of, for example, roughness of surfaces, tolerances allowed in manufacturing, etc., but may still be considered to be perpendicular or parallel.

What is claimed is:

1. A network connector, comprising:

a core body having a front end and a rear end each extending along a first direction to define a width, and having a longitudinal middle portion extending in a second direction perpendicular to the first direction between the front end and the rear end along a longitudinal axis to define a length that is greater than the width, the middle portion having a planar top, a planar bottom, and a planar dividing panel having at least one side surface;

a first set of contacts supported by the core body, each of the of contacts of the first set of contacts having an exposed portion extending outside of the core body;

a second set of contacts supported by the core body, each of the of contacts of the second set of contacts having an exposed portion extending outside of the core body;

a plurality of wires, each of the wires of the plurality of wires being coupled to the first and second sets of contacts;

an internal printed circuit board supported on the planar top of the core body, the internal printed circuit board being coupled to the exposed portions of the first set of contacts;

a mating interface piece coupled to and extending from the front end of the core body, the mating interface piece including mating contacts extending in a perpendicular direction to the longitudinal axis of the core body and through the internal printed circuit board such that the mating interface piece is coupled to the internal printed circuit board;

a magnetic isolation component supported on the at least one side surface and configured to filter electrical signals of the plurality of wires, wherein the exposed portions of the second set of contacts are configured to engage an external printed circuit board, and wherein the magnetic isolation component includes at least one pair of magnetic cores, the at least one pair of magnetic cores including an isolation transformer and a common mode choke, and wherein the isolation transformer includes a rear surface that is mounted against the at least one side surface and the common mode choke includes a rear surface that is mounted against the at least one side surface and is next to the isolation transformer along the length of the core body.

2. The connector of claim 1, wherein the magnetic isolation component includes at least two pairs of magnetic cores and each magnetic core is wrapped by at least one of the plurality of wires, and each of the at least two pairs of magnetic cores are mounted to the at least one side support surface of the middle portion of the core body.

3. The connector of claim 2, wherein the magnetic cores are mounted to a second side surface of the middle portion of the core body, the second side surface is opposite to the at least one side surface of the core body.

4. The connector of claim 2, wherein the at least one side support surface is substantially flat.

5. The connector of claim 2, wherein a length of the middle portion is at least twice a width of the front and rear ends.

6. The connector of claim 5, wherein the magnetic cores include a first isolation transformer and a first common mode choke and include a second isolation transformer and a second common mode choke.

7. The connector of claim 2, wherein the at least one side support surface of the core body is recessed to form a cavity.

8. The connector of claim 7, wherein the magnetic cores are sized to fit within each cavity.

9. The connector of claim 2, wherein at least one of the magnetic cores has an outer diameter in the range of 4.40 mm to 4.80 mm and a thickness in the range of 1.55 mm to 1.95 mm.

10. The connector of claim 1, wherein the magnetic isolation component comprises magnetic cores, and the magnetic cores include at least one isolation transformer and at least one a common mode choke.

11. The connector of claim 1, wherein the magnetic isolation component is secured to the at least one side support surface of the core body by a resin or an epoxy.

12. The connector of claim 1, further comprising a housing shell having an interior receiving area and an open bottom, wherein the core body is received in the interior receiving area and some of the exposed portions of the second set of contacts extend through the open bottom of the housing shell for connecting to the external printed circuit board.

13. The connector of claim 12, further comprising a shield at least partially surrounding the housing shell.

14. The connector of claim 13, wherein the shield includes at least a top wall and opposite side walls, the top wall is configured to cover a top of the housing shell and the side walls are configured to cover opposite sides of the housing shell.

15. The connector of claim 1, wherein the front end of the core body includes an engagement feature for engaging a corresponding engagement feature of the mating interface piece.

16. The connector of claim 1, wherein the plurality of contacts extend in a direction generally perpendicular to the longitudinal axis of the core body.

17. The connector of claim 1, wherein the plurality of contacts are coupled to the core body by an interference fit.

18. The connector of claim 1, further comprising at least one power wire and at least one grounding wire connected between the first and second sets of contacts for providing a power line and a grounding path, respectively.

19. An electrical connector, comprising:

a housing shell having an interior receiving area and an open bottom;

a core body received in the interior receiving area of the housing shell, the core body having a front end and a rear end each extending along a first direction to define a width, and having a longitudinal middle portion extending in a second direction perpendicular to the first direction between the front end and the rear end along a longitudinal axis to define a length that is greater than the width, the middle portion having a planar top, a planar bottom, and a planar dividing panel having at least one side surface;

a first set of contacts supported by the core body, each of the contacts of the first set of contacts has an exposed portion that extends outside of the core body;

a second set of contacts supported by the core body, each of the contacts of the second set of contacts has an exposed portion that extends outside of the core body and extends through the open bottom of the housing shell;

an internal printed circuit board supported on the planar top of the core body, the internal printed circuit board being coupled to the exposed portion of the first set of contacts;

a mating interface piece coupled to and extending from the front end of the core body, the mating interface piece including mating contacts extending in a perpendicular direction to the longitudinal axis of the core body and through the internal printed circuit board such that the mating interface piece is coupled to the internal printed circuit board;

a magnetic isolation component mounted on the at least one side surface between the first set of contacts and the second set of contacts; and a shield, the shield at least partially surrounding the housing shell, wherein the magnetic isolation component includes at least one pair of magnetic cores, the at least one pair of magnetic cores including an isolation transformer and a common mode choke, and wherein the isolation transformer includes a rear surface that is mounted against the at least one side surface and the common mode choke includes a rear surface that is mounted against the at least one side surface and is next to the isolation transformer along the length of the core body.

20. The connector of claim 19, wherein the core body includes a front end, a rear end, and a longitudinal middle portion extending between the front and rear ends, and the isolator is mounted on at least one support side surface of the middle portion.

21. The connector of claim 20, wherein a length of the middle portion is at least twice a width of the front and rear ends, and the at least one side support surface is substantially flat.

22. The connector of claim 20, wherein the at least one side support surface is recessed to form a cavity and the isolator is configured to fit within the cavity.

23. The connector of claim 19, wherein the shield includes at least a top wall and opposite side walls, the top wall is configured to cover a top of the housing shell and the side walls are configured to cover opposite sides of the housing shell.

24. A method of manufacturing a network connector, comprising the steps of:

loading a plurality of contacts onto a core body of the network connector, the core body having a front end and a rear end each extending along a first direction to define a width, and having a longitudinal middle portion extending in a second direction perpendicular to the first direction between the front end and the rear end along a longitudinal axis to define a length that is greater than the width, the middle portion having a planar top, a planar bottom, and a planar dividing panel having at least one side surface;

coupling a mating interface piece with a front end of the core body and coupling the internal printed circuit board to mating contacts of the mating interface piece that extend in a perpendicular direction to the longitudinal axis of the core body and through the internal printed circuit board;

wrapping one or more wires around a magnetic isolation component, the one or more wires being coupled to the plurality of contacts, and the magnetic isolation component including at least one pair of magnetic cores, the at least one pair of magnetic cores including an isolation transformer and a common mode choke;

mounting the magnetic isolation component against the at least one side surface of the middle portion such that a rear surface of the isolation transformer is mounted against the at least one side surface and a rear surface of the common mode choke is mounted against the at least one side surface and next to the isolation transformer along the length of the core body;

coupling an internal printed circuit board to the plurality of contacts of the core body;

assembling a shield over a subassembly of the core body, the plurality of contacts, the magnetic isolation component, and the internal printed circuit board, such that the shield at least partially surrounds the subassembly.

25. The method of claim 24, further comprising the step of inserting the subassembly into a housing shell prior to the step of assembling the shield over the subassembly of the core body, the plurality of contacts, the magnetic isolation component, and the internal printed circuit board.

26. The method of claim 24, wherein the step of assembling the shield includes the shield covering a top of the housing shell and covering opposite sides of the housing shell.

27. The method of claim 24, further comprising the step of coupling at least one power wire to the plurality of contacts to provide at least one power line.

28. The method of claim 24, further comprising the step of coupling at least one grounding wire to the plurality of contacts to provide at least one grounding path.

* * * * *